(12) United States Patent
Tomiyama et al.

(10) Patent No.: US 7,030,524 B2
(45) Date of Patent: Apr. 18, 2006

(54) MOTOR FOR DRIVING BLOWER FAN

(75) Inventors: Masaharu Tomiyama, Tokyo (JP); Setsuya Uchino, Tokyo (JP); Kenjiro Nakahara, Tokyo (JP); Ken Egawa, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 741 days.

(21) Appl. No.: 09/816,348

(22) Filed: Mar. 26, 2001

(65) Prior Publication Data

US 2002/0047422 A1    Apr. 25, 2002

(30) Foreign Application Priority Data

Mar. 27, 2000   (JP)   ............ P. 2000-086649

(51) Int. Cl.
  *H02K 5/00*   (2006.01)
(52) U.S. Cl. ............ 310/89; 310/154.01; 310/154.12; 310/85
(58) Field of Classification Search ........... 310/154.01, 310/154.03, 154.04, 154.06–154.08, 154.12, 310/154.13, 154.16–154.19, 154.22, 154.23, 310/154.38, 51, 66, 85, 89, 91, 254, 258
See application file for complete search history.

(56) References Cited

U.S. PATENT DOCUMENTS

| 4,566,866 | A | * | 1/1986  | Kemmner ............... 310/154.08 |
| 4,661,729 | A | * | 4/1987  | Hames et al. ................. 310/12 |
| 4,873,461 | A | * | 10/1989 | Brennan et al. ........ 310/154.12 |
| 5,073,738 | A | * | 12/1991 | Tang ..................... 310/154.16 |
| 5,576,588 | A | * | 11/1996 | Moribayashi et al. ..... 290/38 R |
| 5,869,913 | A | * | 2/1999  | Ohya et al. ............ 310/154.12 |
| 6,028,378 | A |   | 2/2000  | Lack et al. .................... 310/51 |

FOREIGN PATENT DOCUMENTS

| DE | 225 885 A3    | 8/1985  |
| JP | 59-178931     | 10/1984 |
| JP | 2-197235      | 8/1990  |
| JP | 9-322468      | 12/1997 |
| JP | 10-51994      | 2/1998  |
| JP | 2000-253617   | 9/2000  |

* cited by examiner

*Primary Examiner*—Dang Le
(74) *Attorney, Agent, or Firm*—Sughrue Mion, PLLC (57) ABSTRACT

A reinforcing ring (22) includes a ring portion (23) and a cylinder portion (24) is press fitted on a portion which is slightly shifted toward the rear end side from portions on which stators (2) are fixed on parts of a case body (1).

4 Claims, 8 Drawing Sheets

MOTOR FOR DRIVING BLOWER FAN

BACKGROUND OF THE INVENTION

1. Field of the Invention

The present invention relates to a motor for driving a blower fan that is used, for example, for driving to rotate a blower fan of a car air conditioner which air-conditions the inside of the car.

2. Description of the Related Art

A car air conditioner comprises a blower fan disposed on the upstream end of a duct that is mounted with an evaporator for cooling air and a heater core for heating the same. The car air conditioner conditions air, which is taken in from the inside of a car or the outside of the car through an intake provided on the upstream end of the duct, to be a predetermined temperature by means of at least one of the evaporator and heater core, and then blows the air into the car.

A centrifugal multiblade fan is generally used as the abovedescribed blower fan, and the centrifugal multiblade fan is driven to rotate by a motor. Such a motor for driving a blower fan generally comprises a case body cylindrically formed of an iron based magnetic material and a pair of stators (permanent magnets) are supported and fixed at two positions on opposite sides in the diametrical direction of the middle portion in the axial direction of the inner circumferential surface of the case body. In addition, a rear end plate is bound and fixed on a rear end opening portion of the case body and a front end plate is bound and fixed on a front end opening portion of the same.

Then, a rotary drive shaft is inserted into the central portion of the case body and the rear end portion of the rotary drive shaft is supported on the rear end plate and the forward middle portion thereof is supported on the front end plate to be rotated freely by means of a bearing, respectively. A rotor is fixed at a portion opposed to the inner circumferential surfaces of the pair of stators of the middle portion of the rotary drive shaft, and a commutator for conducting a current to said rotor is fixed at a portion apart from the rotor of the same. Also, a brush is supported on a portion opposed to the outer circumferential surface of the commutator of the inside the case body so as to be freely displaced in the diametrical direction of the commutator. Then, the inner end face of the brush is elastically urged to the outer circumferential surface of the commutator.

The blower fan is fixed on the portion projected from the front of the front end plate of the front end portion of the rotary drive shaft. When the motor of the blower fan comprised as mentioned above is incorporated in a car air conditioner, the motor excluding its front end portion is stored and supported in a cylindrical attachable bracket with a bottom made of a synthetic resin. Then, the attachable bracket is fixed on the outer wall of the upstream end portion of the duct by means of an attaching flange provided on the outer circumferential surface of the middle portion.

When the car air conditioner is used, by conducting a current through the brush and commutator to the rotor, the blower fan is driven to rotate via the rotary drive shaft. As a result, air for air harmonization flows from the upstream end opening of the duct toward the downstream end opening. Herein, a part of the air is sent into the attachable bracket through an air-supply hose connected to the attachable bracket and sent further into the case body. Then, the air flows from the rear end side to the front end side in the case body, cools components of the motor for driving a blower fan, and is then discharged outside the motor via an exhaust hole provided on the front end plate. Thereafter, the air joins air sent from the upstream end opening of the duct and flows in said duct toward the downstream end opening.

The rotor composing the motor for driving a blower fan is formed by winding coils, respectively, around slots provided at a plurality of spots (for example, six spots) in the circumferential direction of the outer circumferential surface of a core made of laminated steel plates. Then, the rotary drive shaft is rotated by a magnetic suction and magnetic repulsive force which occur between magnetic fields that occur around each coil by conduction of a current to each coil and magnetic fields that exist at the portion of the pair of stators. Herein, since the coils are provided intermittently in the circumferential direction of the rotor, the magnetic suction and magnetic repulsive force are increase and decrease according to the rotation of the rotor. However, said rotor and the rotary drive shaft continue to rotate at an almost uniform speed due to the inertia of the rotor and rotary drive shaft.

However, in the motor for driving a blower fan which is structured and effects as mentioned above, according to the rotation of the rotary drive shaft, the magnetic suction and magnetic repulsive force alternately effect respective portions of each stator in terms of the diametrical direction of the case body. Therefore, each stator vibrates in the diametrical direction of the case body and the case body having the stators fixed on the inner circumferential surface thereof vibrates similarly. Such vibration of the case body is transmitted to the duct via the attachable bracket and there arises a possibility that noise in the car caused by the duct vibration becomes so loud as to make a driver uncomfortable. In order to prevent the noise that occurs due to such causes, suppression of the vibration of the case body by increasing the thickness of the whole plate members composing the case body can be considered. However, such a measure causes a substantially increased weight and cost of the motor for driving a blower fan, and hence is not preferable.

SUMMARY OF THE INVENTION

In view of the circumstances as mentioned above, the present invention is made to effectively prevent a unit, in which a motor for driving a blower fan has been incorporated, from making noise by effectively suppressing vibration which occurs to a case body.

Similar to the conventional motor for driving a blower fan as mentioned above, the motor for driving a blower fan according to the present invention comprises a cylindrical case body, a rear end plate fixed on a rear end opening portion of the case body, a front end plate fixed on a front end opening portion, a rotary drive shaft which is inserted into the central portion of the case body and whose rear end portion is supported on the rear end plate and whose forward middle portion is supported on the front end plate to be rotated freely by means of a bearing, respectively, a rotor fixed on the middle portion of the rotary driving shaft, and stators which are fixed on the inner circumferential surface of the case body and opposed to the outer circumferential surface of the rotor.

In particular, the motor for driving a blower fan of the present invention comprises reinforcing portions which are provided at portions which include at least the vicinities of the portions where the end portions of the stators are fixed on parts of the case body. By means of these reinforcing portions, the portions where the stators are fixed on the parts of the case body become resistant to deformation.

Furthermore, in the motor for driving the blower fan according to the invention, the abovedescribed reinforcing portions are made as a reinforcing ring made of a hard material which is fixed on a part of the inner circumferential surface of the case body and formed in an annular shape as a whole.

According to the motor for driving the blower fan of the present invention constructed as mentioned above, vibration which occurs in the case body can be sufficiently suppressed. In addition, according to the present invention, the weight and cost of the motor for driving a blower fan do not remarkably increase for the purpose of suppressing the vibration. As a result, the occurrence of noise in a unit in which this motor for driving a blower fan is incorporated can be effectively suppressed.

Furthermore, according to the motor for driving the blower fan, by making the portions where the stators are fixed on the parts of the case body become resistant to deformation, vibration which occurs in the case body can be sufficiently suppressed.

BRIEF DESCRIPTION OF THE INVENTION

DETAILED DESCRIPTION OF THE PRESENT INVENTION

Referring to the accompanying drawings, the present invention will be described below.

First Embodiment

Figure 3:
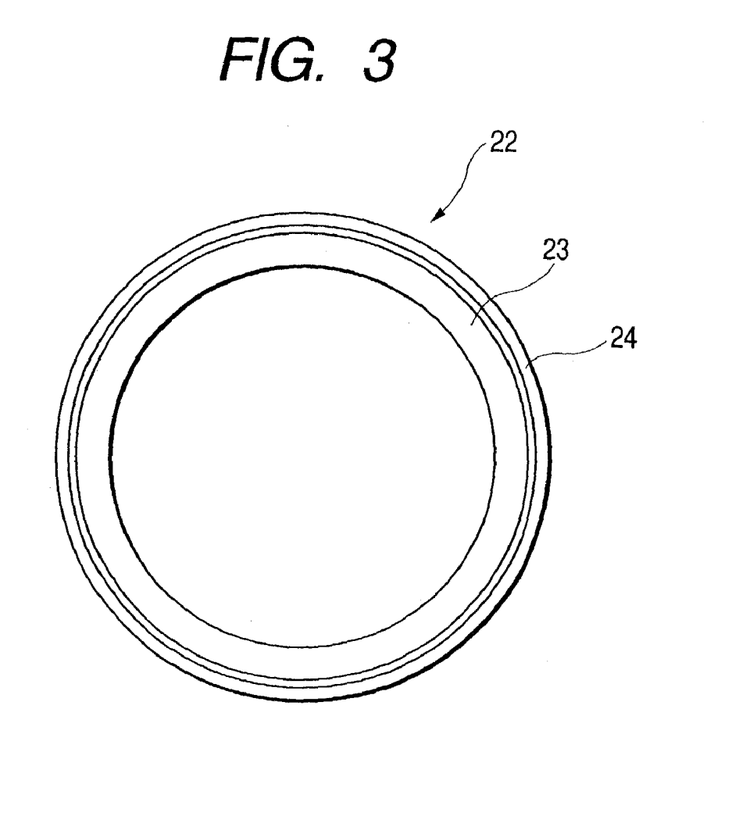
FIG. 3 is a view of the reinforcing ring as seen from the bottom of FIG. 2.
Figure 4:
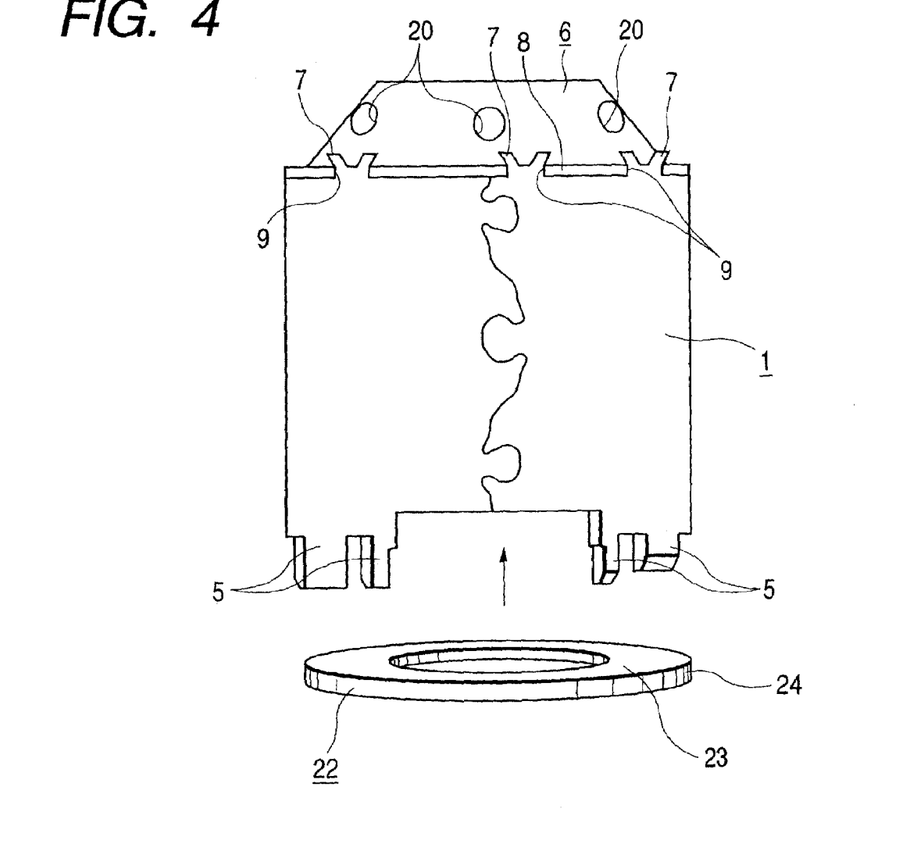
FIG. 4 is a side view showing a condition where the reinforcing ring is press fitted inside a case body.
Figure 5:
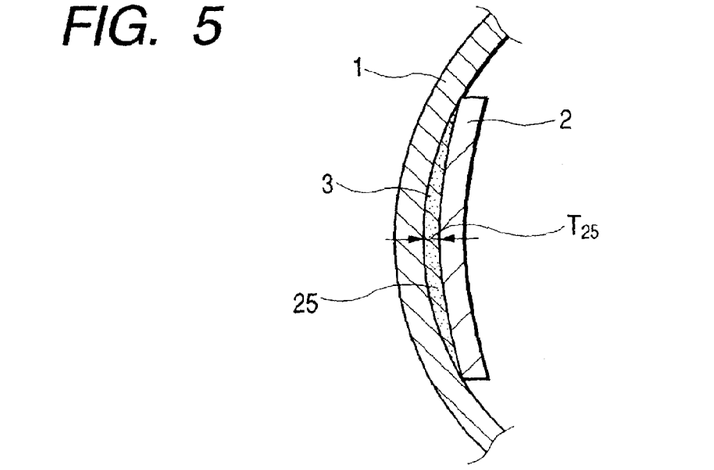
FIG. 5 is a view focusing only on a clearance portion between the outer circumferential surface of a stator and the inner circumferential surface of the case body in the section along A—A line of FIG. 1.

FIGS. 1 to 5 show a first embodiment of the present invention. Similar to the conventional construction as mentioned before, a motor of the first embodiment is used for driving a blower fan (not illustrated) of a car air conditioner and includes a case body 1 which is cylindrically formed of an iron based magnetic material. In a condition where the blower fan is incorporated in the car air conditioner, the case body 1 is disposed substantially in the vertical direction. At two positions on opposite sides in the diametrical direction of the middle portion in the axial direction of the inner circumferential surface of the case body 1, a pair of stators (permanent magnets) 2 are supported and fixed. These stators 2 are respectively formed in a partially cylindrical shape as a whole having an arc-like section and the radius of curvature of each outer circumferential surface is formed to be slightly larger than the radius of curvature of the inner circumferential surface of the case body 1. Then, in a condition where the both edge portions of the stators 2 with respect to the circumferential direction of the case body 1 and the inner circumferential surface of the case body 1 are in contact with each other, the stators 2 are respectively fixed by a glue 3, as shown in FIG. 5, on the inner circumferential surface of the inner circumferential surface of the case body 1. Therefore, in the present embodiment, the glue 3 is filled in a clearance portion 25, as shown in FIG. 5, between the outer circumferential surface of each of the stators 2 and the inner circumferential surface of the case body 1. Accordingly, in the first embodiment, the bonding strength between both members 1 and 2 can be sufficiently secured and it is possible to make the vibration of the stators 2 be hardly transmitted. That is, the glue 3 filled with in the clearance portion 25 between both circumferential surfaces not only joins both circumferential surfaces but also absorbs the vibration.

Also, on an opening portion of the rear end (the bottom end of FIG. 1 and FIG. 4) of the case body 1, a rear end plate 4 made of a synthetic resin is fixed. Here, in the first embodiment, a plurality of latching projections 5 are formed at a plurality of positions in the circumferential direction of the rear edge of the case body 1 so that they project in the axial direction, respectively, and the plurality of latching portions 5 are engaged with a plurality of latch notches (not illustrated) provided on the outer circumferential end portion of the rear end plate 4.

On the other hand, on an opening portion of the front end (upper end of FIG. 1 and FIG. 4) of the case body, a front end plate 6 made of a metal plate such as a steel plate is fixed. Therefore, in the first embodiment, at a plurality of positions in the circumferential direction of the front edge of the case body 1, fixing projections 7 whose tip portions are respectively branched such as a fork are formed so that they project in the axial direction, respectively. Then, while the fixing projections 7 are engaged with a plurality of latch grooves 9 provided at a plurality of positions in the circumferential direction of a ring portion 8 provided on the outer circumferential end potion of the front end portion 6, one surface of the ring portion 8 and the front end surface of the case body 1 are butted. Then, in this condition, the tips of the fixing projections 7 are widened toward both sides of the circumferential direction, whereby the front end plate 6 is fixed onto the front end opening portion of the case body 1.

Figure 1:
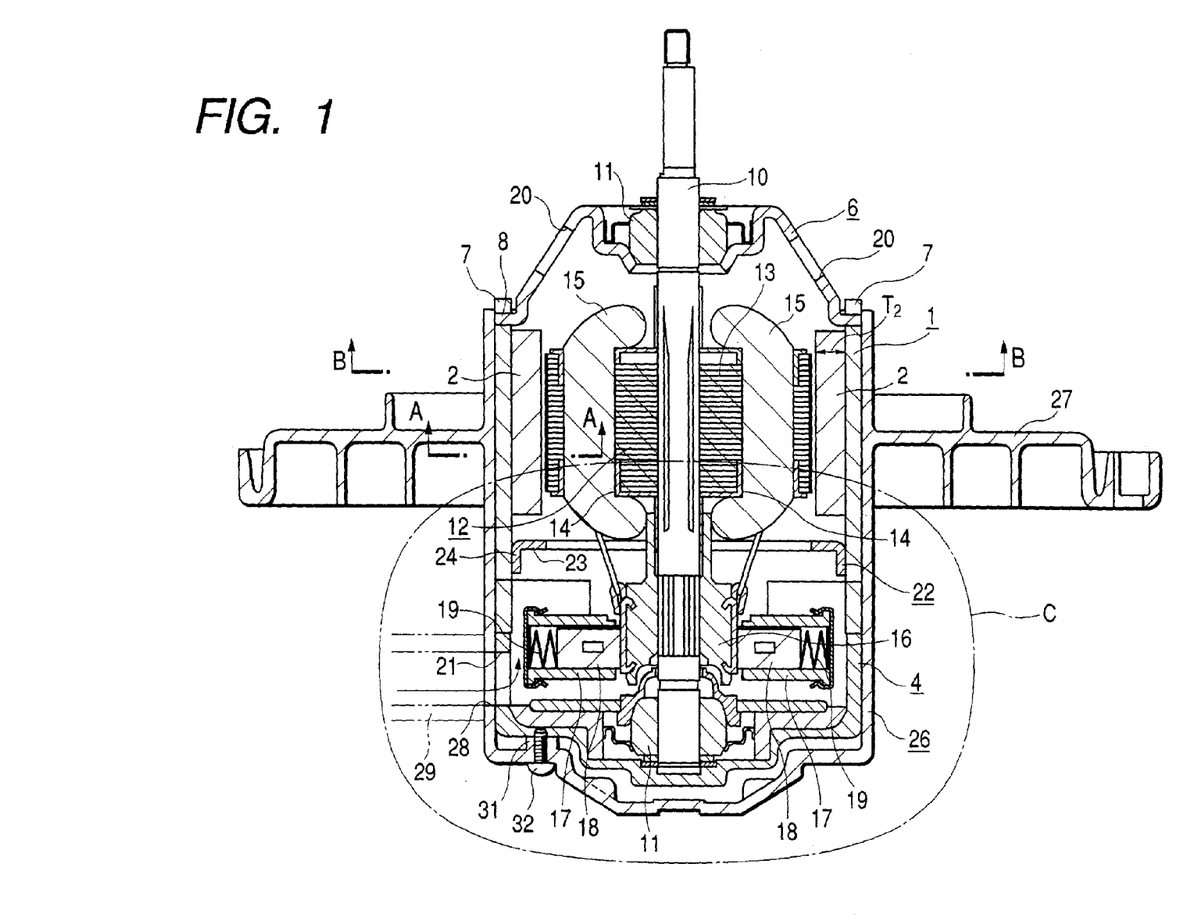
FIG. 1 is a longitudinal side section showing a first embodiment of the invention which is held in the attachable bracket.

Also, a rotary drive shaft 10 is inserted in the central portion of the case body 1. The rear end portion of the rotary drive axis 10 is supported on the central portion of the rear end plate 4 and a forward middle portion of the same is supported on the central portion of the front end plate 6 so as to be freely rotated by slide bearings 11, respectively. Then, in the middle portion of the rotary drive shaft 10, on a portion which is located between the slide bearings 11 and 11 and is opposed to the inner circumferential surfaces of the pair of stators 2, a rotor 12 is fixed. The rotor 12 is formed by winding coils 15, respectively, around slots 14 provided at a plurality of positions in the circumferential direction of the outer circumferential surface of a core 13 made of laminated steel plates. Also, on a portion between the rotor 12 and rear end plate 4 in the middle portion of the rotary drive shaft 10, a commutator 16 for conducting a current to the respective coils 15 is fixed.

On the other hand, on portions opposed to the commutator 16 in a rearward portion inside the case body 1, two brush holders 17 formed of an insulating material such as a synthetic resin are fixed via brush substrates (not illustrated). Then, brushes 18 are stored in the brush holders 17, respectively, so as to be freely displaced in the diametrical direction of the case body 1. These brushes 18 are respectively conducted to coupler terminals (not illustrated) provided on the outer circumferential surface of the case body 1. Also, resilience which is forced inward in the diametrical direction of the case body 1 is provided by means of springs 19 supported in the brush holders 17, respectively. Accordingly, the inner end faces of the brushes 18 resiliently slide and fit to the outer circumferential surface of the commutator 16.

Also, at a plurality of positions in the circumferential direction of the front end plate 6, a plurality of exhaust holes 20 for discharging cooling air are formed, respectively. On the contrary, an inner air-supply hole 21 for sending the air into the case body 1 therethrough is formed on a part of the rear end plate 4.

Figure 2:
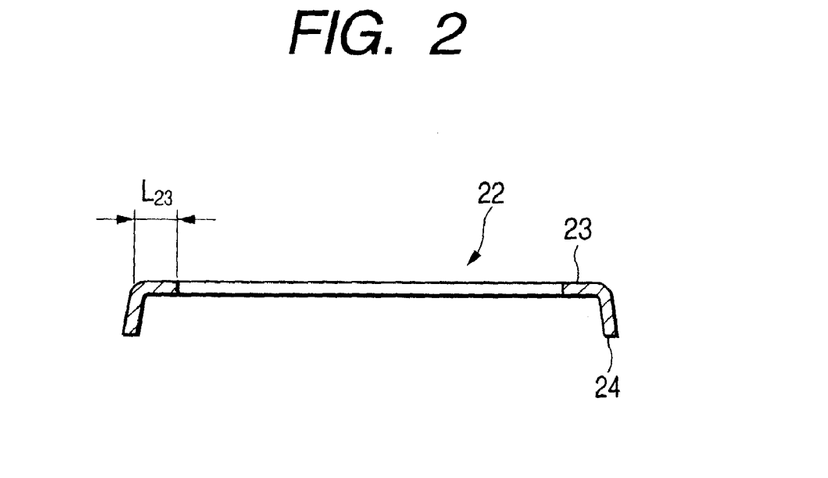
FIG. 2 is a section showing only a reinforcing ring.

In particular, in the case of a motor for driving a blower fan of the invention, are in forcing ring 22 made of a hard material such as a steel plate, which is formed in an annular shape as a whole, is fixed on a portion that is slightly shifted toward the rear end side from the portions where the respective stators 2 are fixed on the parts of the inner circumferential surface of the case body 1. The reinforcing ring 22 is, as shown in FIGS. 2 and 3 in detail, constructed by pressing the hard material and comprises a ring portion 23 and a cylinder portion 24 which is formed so as to continue from the outer peripheral edge of the ring portion 23. Also, in the first embodiment, when the reinforcing ring 22 is in a free condition, both circumferential surfaces of the cylinder portion 24 are provided as conic surfaces which are inclined in a direction such that the diameter becomes large as it becomes more distant from the ring portion 23. Furthermore, in the first embodiment, a length $L_{23}$ in the diametrical direction 23 of the ring portion is set to be the same as the thickness $T_2$ or more of the respective stators 2 and 2 ($L_{23} \geq T_2$). However, it is further preferable that the length $L_{23}$ in the diametrical direction 23 is set to be the same in length or more in that the maximal thickness $T_{25}$, as shown in FIG. 5, of the clearance portion 25 between the outer circumferential surface of the respective stators 2 and the inner circumferential surface of the case body 1 is added to the thickness $T_2$ of the respective stators 2 and 2 ($L_{23} \geq T_2 + T_{25}$)

The reinforcing ring 22 constructed as mentioned above is fixed by press fitting on a portion that is slightly shifted toward the rear end side from the portions where the stators 2 are fixed on the parts of the inner circumferential surface of the case body 1. Therefore, in the first embodiment, as shown in FIG. 4, the reinforcing ring 22 is press fitted inside the rear end portion of the case body 1 from the side where the ring portion 23 is provided while the diameter of the cylinder portion 24 is resiliently shrinked. Accordingly, the outside diameter of the ring portion 23 is set to be the same as or slightly smaller than the inside diameter of the case body 1, and the maximum outside diameter of the cylinder portion 24 in a free condition is set to be slightly greater than the inside diameter of the case body 1. In the first embodiment, since the reinforcing ring 22 is fixed on the case body 1 as mentioned above, it becomes possible to make the portions where the stators 2 are fixed on the parts of the case body 1 resistant to deformation (high in rigidity).

When the motor for driving a blower fan of the invention constructed as described above is incorporated in a car air conditioner as mentioned above, the blower fan is fixed on a portion that is projected from the front surface of the front end plate 6 of the front end portion of the rotary drive shaft 10. Also, the motor excluding its front end portion is stored and supported in a cylindrical attachable bracket 26 having a bottom made of a synthetic resin. Then, the motor is fixed on the outer wall of an upstream end portion of a duct (not illustrated) which composes the car air conditioner by means of an attaching flange 27 provided and fixed on the outer circumferential surface of the middle portion of the attachable bracket 26. Herein, a part of the rear end face of the rear end plate 4 which is provided on the rear end portion of the motor is butted to the tip face of a projection 31 provided on a part of the bottom surface of the attachable bracket 26. Also, the projection 31 and the part of the rear end plate 4 are combined by means of a screw 32. Accordingly, a clearance is formed between the rear end face of the rear end plate 4 and the bottom surface of the attachable bracket 26 except for the portion where the projection 31 is provided. Thus, since a clearance exists, the vibration which occurs at the rear end plate 4 comes to be barely transmitted to the attachable bracket 26.

Also, at a position which coordinates with an inner air-supply hole 21 formed on the rear end plate 4 on a part of the attachable bracket 26, an outside air-supply hole 28 is provided, and the outside air-supply hole 28 and a portion where the air blown out by the blower fan passes in the middle portion of the duct are communicated by means of an air-supply hose 29. Accordingly, when the car air conditioner is running, a part of the air that circulates in the duct is sent into the attachable bracket 26 and said air further passes through inside the motor and then goes out to the rear side portion of the blower fan, and thus the components of the motor can be cooled.

In particular, in the motor for driving a blower fan of the present invention, vibration that occurs in the case body 1 can be effectively suppressed. That is, as mentioned before, the stators 2 are respectively fixed by the glue 3 on the inner circumferential surface of the case body 1 in the condition where both end portions in the circumferential direction are in contact with the inner circumferential surface of the case body 1, respectively. Accordingly, when the rotary drive shaft 10 is rotating, the magnetic suction and magnetic repulsive force alternately effect respective portions of the respective stators 2, thereby causing vibration caused by partial deformation of the case body 1.

With respect to the above, according to the present invention, the reinforcing ring 22 that is made of a hard material, which is formed in an annular shape as a whole, is fixed by press fitting on the portion that is slightly shifted toward the rear end side from the portions where the respective stators 2 are formed, that is, the portion including the vicinities of the portions where both end portions of the respective stators 2 are fixed on parts of the case body 1. Thus, the portions where the stators 2 are fixed on the parts of the case body 1, respectively (the portions where the respective stators 2 are fixed with respect to the axial direction as well as where the respective stators 2 are intermittent with respect to the circumferential direction) are sufficiently made resistant to deformation. Therefore, when the rotary drive shaft 10 is driving to rotate, the case body 1 can be sufficiently prevented from vibrating even if the stators 2 tend to vibrate in the radial direction of the case body 1. In addition, in the present invention, the weight and cost of the motor do not remarkably increase for the purpose of suppressing the vibration in the case body 1. As a result, the occurrence of noise in the car air conditioner with the abovementioned motor incorporated can be effectively suppressed.

Also, in the present invention, since the reinforcing ring 22 is provided with the cylinder portion 24 on the outer circumferential end portion, by effectively securing the strength of the reinforcing ring 22, vibration in the case body 1 can be suppressed more sufficiently. In addition, in the first embodiment, the length $L_{23}$ in the diametrical direction of the ring portion 23 composing the reinforcing ring 22 is set not to be less than the thickness $T_2$ of the respective stators 2 ($L_{23} \geq T_2$). Therefore, when the car air conditioner is running, by reducing the amount of cooling air sent in the motor through the inner air-supply hole 21 which flows via the clearance formed between end portions in the circumferential direction of the respective stators 2, more air can be applied directly and uniformly to the portions of the coils 15 and 15 composing the rotor 12, which are the portions which especially need to be cooled. Thus, in the first embodiment, the cooling efficiency of the motor can be improved.

Furthermore, in the first embodiment when the reinforcing ring 22 is in a free condition, the outer circumferential surface of the cylinder portion 24 composing the reinforcing ring 22 is provided as a conic surface which is inclined in a direction such that the diameter becomes large as it becomes more distant from the ring portion 23. Accordingly, workability for assembling the reinforcing ring 22 can be improved compared to a case employing a simple cylindrical surface as the outer circumferential surface of the cylinder portion 24 and, in addition, releasability from a mold can be improved when the reinforcing ring 22 is formed by pressing. Moreover, since the reinforcing ring 22 is fixed by press fitting in the case body 1, the contact area between the outer circumferential surface of the reinforcing ring 22 and a partial inner circumferential surface of the case body 1 can be increased. Accordingly, deformation of the part of the case body where the reinforcing ring 22 is fixed can be sufficiently suppressed, whereby the vibration in the case body 1 can be further sufficiently suppressed. Moreover, in the first embodiment, since the outer circumferential surface of the cylinder portion 24 of the reinforcing ring 22 has such an inclined shape as mentioned above, the power necessary for the press fitting operation of the reinforcing ring 22 can be reduced.

Experiments

Figure 6A:
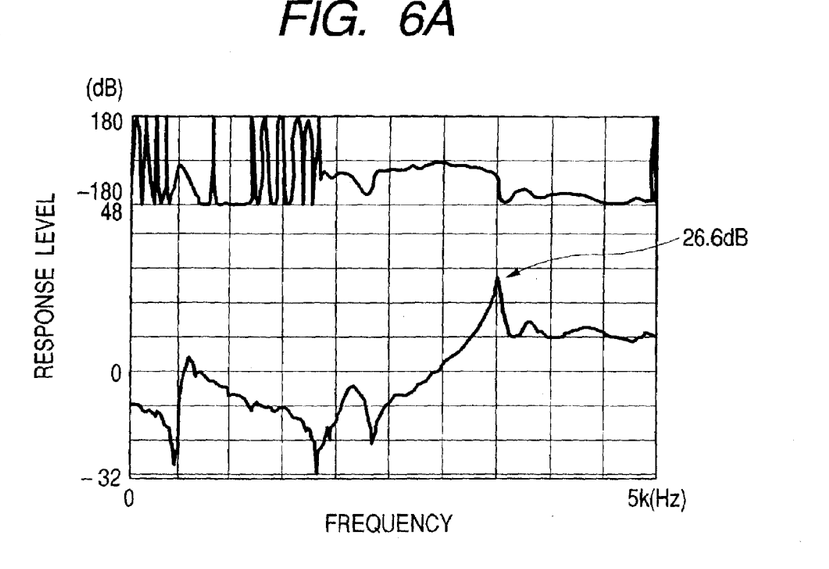
FIGS. 6A and 6B are graphs each showing a relationship between a natural frequency a response level of a conventional product (A) and a product of the invention (B) as the first experimental results.
Figure 6B:
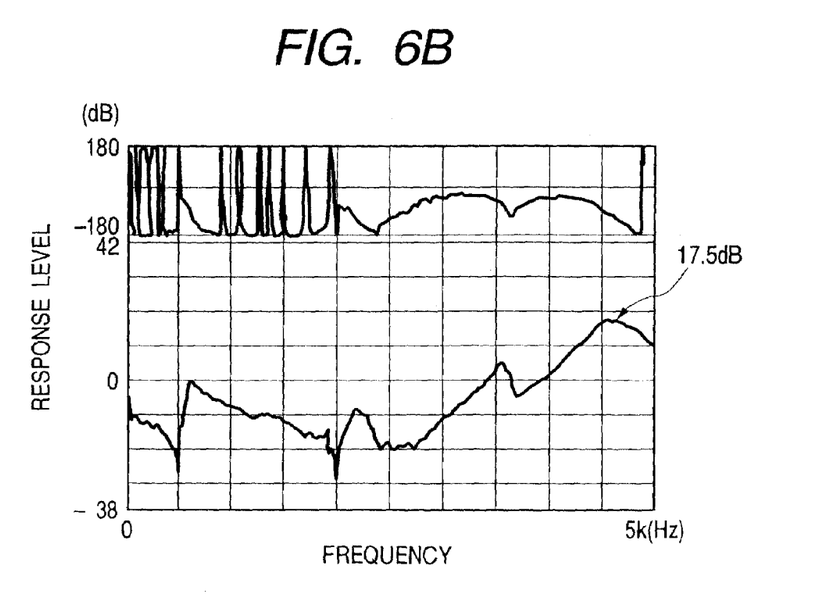

Now, first and second experiments which have been conducted by the inventors of the present invention to verify the effects of the present invention will be described. First, the first experiment was conducted, wherein impact excitation was carried out on the motor of the invention in which the reinforcing ring 22 has been provided (product of the invention) and a motor in which the reinforcing ring has not been provided (conventional product) and each natural frequency and response level were respectively measured. Herein, the structures excluding the reinforcing ring 22 were the same between the product of the invention and the conventional product. In FIG. 6A, experimental results of the conventional product are shown and in FIG. 6B, experimental results of the product of the invention are shown. In each drawing, a waveform of vibration applied by impact excitation is shown at the top and a response waveform to the vibration is shown at the bottom. As can be understood by comparing these experimental results, according to the product of the invention, the natural frequency is increased by approximately 1000 Hz and the response level at the natural frequency is decreased by approximately 9.1 dB compared to those of the conventional product, whereby vibration can be sufficiently suppressed.

Figure 7:
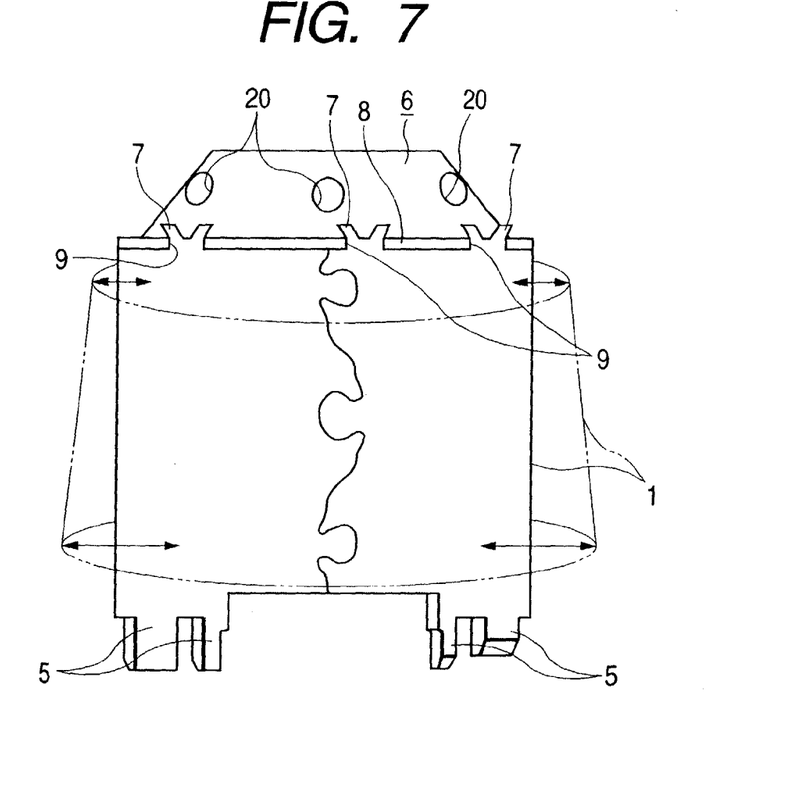
FIG. 7 is a side view, which is used for description of the size of the amplitude level of vibration which occurs in the case body, showing the case body and front end plate in a condition where the rear end plate is detached.
Figure 8:
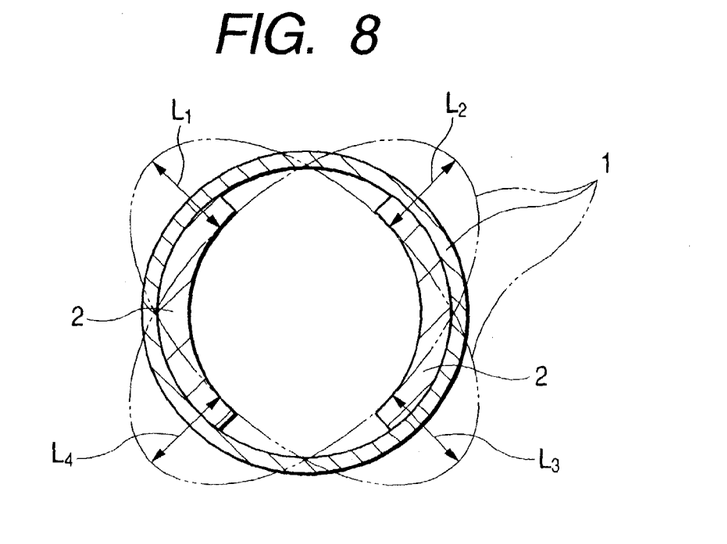
FIG. 8 is a schematic section along the B—B line of FIG. 1 with partial omission, which is used for description of the vibration according to the first mode.
Figure 9:
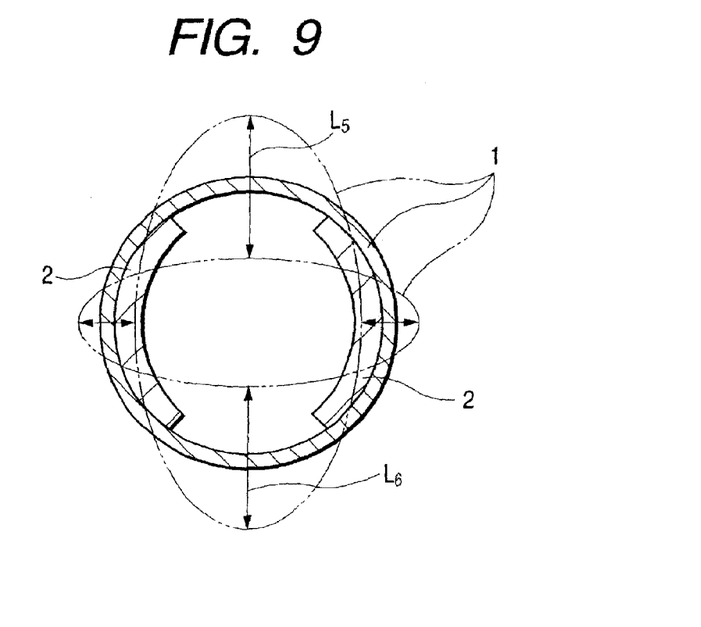
FIG. 9 is a section similar to FIG. 8 which is used for description of the vibration according to the second mode.
Figure 10A:
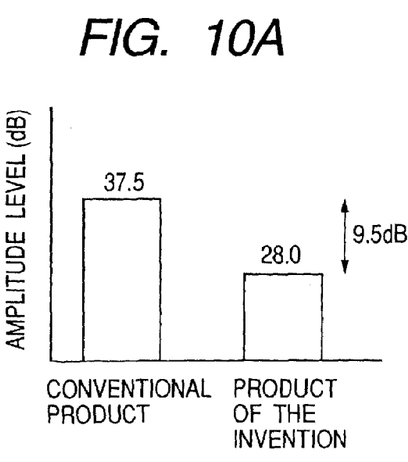
FIGS. 10A and 10B are graphs each showing an amplitude level of vibration at the front end portion of the case body in terms of the conventional product and the product of the invention as the second experimental results in a separated manner by the first mode (A) and the second mode (B).
Figure 10B:
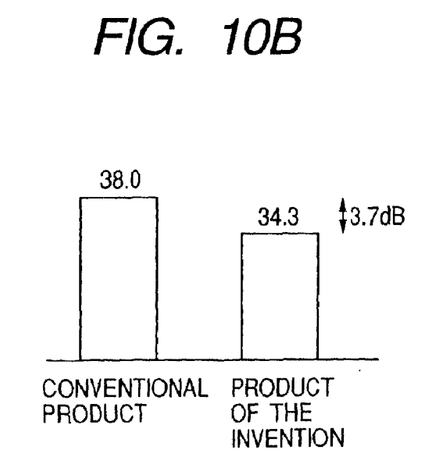
Figure 11A:
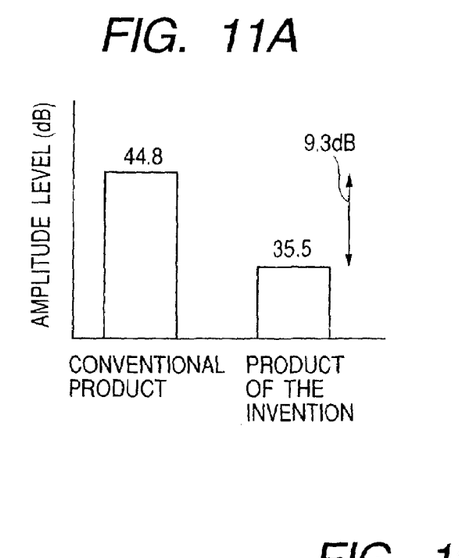
FIGS. 11A and 11B are graphs each showing the amplitude level of vibration at the rear end portion of the case body in terms of the conventional product and the product of the invention in a separated manner by the first mode (A) and the second mode (B).
Figure 11B:
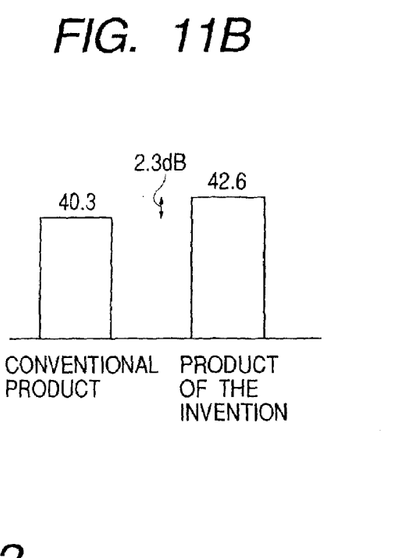

Then, the second experiment which has been conducted by the inventors of the present invention will be described. As mentioned before, in the motor for driving a blower fan of the present embodiment, the metallic front end plate 6 which is relatively resistant to deformation is fixed on the front end opening portion of the case body 1, and the rear end plate 4 made of a synthetic resin which deforms relatively easily is fixed on the rear end opening portion thereof. Accordingly, an amplitude level in the radial direction of the case body 1 becomes, as shown by the size of the arrow in FIG. 7, the minimum at the front end portion of the case body 1 whereas it becomes the maximum at the rear end portion. Therefore, in the second experiment, an amplitude level of both end portions in the axial direction of the case body 1 is measured by a first mode and a second mode. Herein, the amplitude level of vibration of the first mode means, as shown by $L_1$ to $L_4$ in FIG. 8, an amplitude level of vibration in the radial direction of the portions where both end portions of the stators 2 and 2 are opposed to the inner circumferential surface thereof on a part of the case body, and in FIGS. 10A, 10B, 11A and 11B, the average values of measurements of $L_1$ to $L_4$ are shown. Also, the amplitude level of vibration of the second mode means, as shown by $L_5$ and $L_6$ in FIG. 9, an amplitude level of vibration in the radial direction of portions where the phase is shifted by 90° C. from the positions opposed to the central portions in the circumferential direction of the stators 2, and in FIGS. 10A, 10B, 11A and 11B, average values of measurements of $L_5$ and $L_6$ are shown. The portions where the phase is shifted by 90° C. in the circumferential direction from the positions opposed to the central portions in the circumferential direction of the stators 2 on the parts of the case body 1 correspond to portions which are substantially apart from both end portions of the stators 2, which cause vibration in the case body 1, however, since rigidity at such portions becomes relatively small, the amplitude level of the vibration easily becomes relatively high.

FIGS. 10A, 10B, 11A and 11B show measurement results of the amplitude levels of the vibration of both end portions in the axial direction of the case body 1 in terms of the conventional product and the product of the invention, respectively. As can be clearly understood from these experimental results, in the product of the invention, the amplitude level of the vibration can be sufficiently lowered compared to the conventional product. Furthermore, in the product of the invention, the amplitude level of the vibration by the second mode at the rear end portion of the case body 1 is slightly increased (by 2.3 dB) compared to that in the conventional product, however, an increase to this degree causes no problems in practical use.

Furthermore, unlike the first embodiment, the reinforcing ring may be fixed on positions on the opposite side of the stators 2, that is, not on the inner circumferential surface of the case body 1 but on parts of the outer circumferential.

Also, the reinforcing ring may be provided as a simple ring shape in which the cylinder portion 24 is not provided, or the outer circumferential surface of the cylinder portion 24 may be provided as a simple cylindrical surface shape in that the outer circumferential surface is not an inclined surface of the case body 1. Also, the reinforcing ring 22 may be fixed not by press fitting but by a fixing means such as adhering. Furthermore, the reinforcing ring 22 may be fixed on the front end portion of the case body 1. However, as described before, since the vibration that occurs in the case body 1 is likely to become great at the rear end portion, it is preferable for suppression of the vibration in the case body 1 that the reinforcing ring 22 is fixed on the rear end portion.

Second Embodiment

Figure 12:
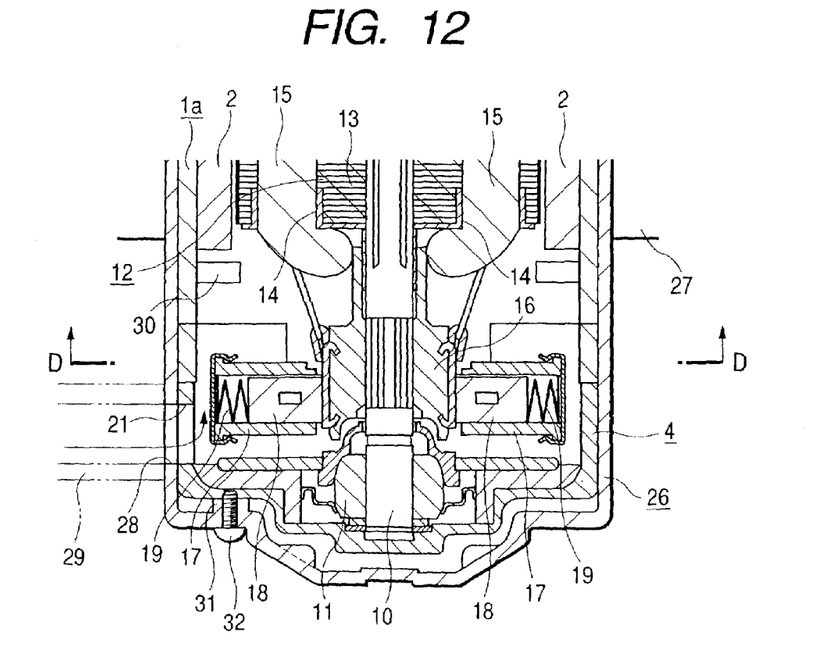
FIG. 12 is a view showing a second embodiment of the invention, which corresponds to C portion of FIG. 1.
Figure 13:
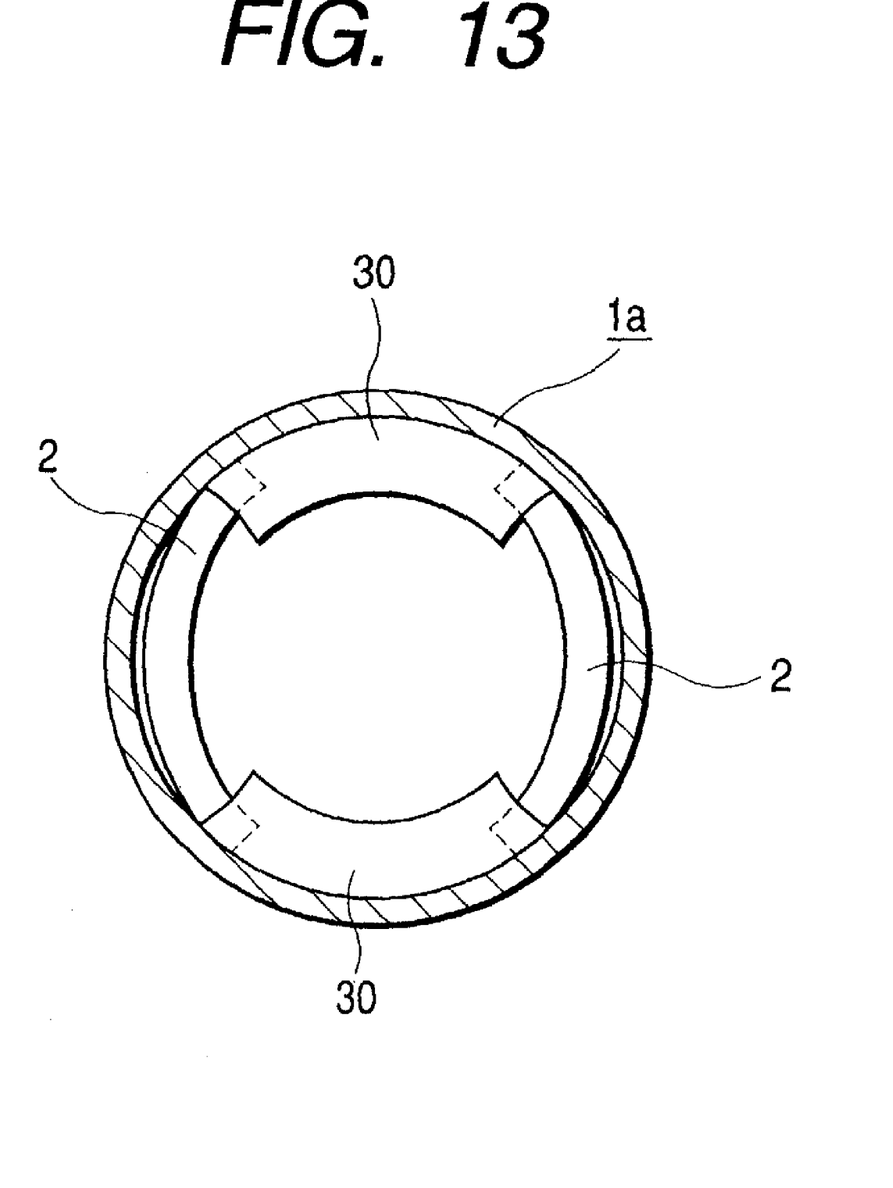
FIG. 13 is a schematic section along the D—D line of FIG. 12 shown with partial omission.

Then, FIGS. 12 and 13 show a second embodiment of the present invention. In the second embodiment, bent portions 30, which respectively serve as a reinforcing portion, are formed by bending a plurality of portions in the circumferential direction (two portions corresponding to the portions where the stators 2 and 2 intermit in the illustrated example) in the circumferential direction of the case body 1a, that is, on the rear end portion (bottom end portion of FIG. 12) of the case body 1a toward the inside diameter side. In order to form such bent portions 30, in the present embodiment, the inward portions of notches, each having an approximately U-shape, which are formed at portions which are slightly apart with respect to the axial direction from the portions where the pair of stators 2 are fixed toward the rear end side are bent at an approximately right angle toward the inside diameter side of the case body 1a, whereby the bent portions 30 are provided. Then, by means of the bent portions 30 and 30, the portions between the stators 2 are made resistant to deformation on parts of the case body 1.

In the case of the present invention thus constructed, without increasing the weight and cost of the motor for driving a blower fan, the vibration in the case body 1a can be sufficiently suppressed. Consequently, occurrence of noise in a car air conditioner in which the motor is incorporated can be effectively suppressed.

The motor for driving a blower fan of the invention is constructed and acts as has been mentioned above, therefore, the occurrence of loud noise in a unit in which the motor for driving a blower fan is incorporated can be effectively suppressed.

What is claimed is:

1. A motor for driving a blower fan comprising:
a cylindrical case body having a front end opening portion and a rear end opening portion;
a rear end plate fixed on the rear end opening portion of the case body, the rear end plate having a first bearing;
a front end plate fixed on the front end opening portion of the case body, the front end plate having a second bearing;
a rotary drive shaft inserted into the central portion of the case body, the rotary drive shaft whose rear end portion is rotatably supported on the rear end plate through the first bearing and whose forward middle portion is rotatably supported on the front end plate through the second bearing;
a rotor fixed on the middle portion of the rotary drive shaft;
a stator fixed on the inner circumferential surface of the case body to face to the outer circumferential surface of the rotor; and
a circumferential reinforcing element provided in the vicinity of an end portion of the stator,
wherein the circumferential reinforcing element includes a ring portion and a cylinder portion extending from an outer peripheral edge of the ring portion, and
wherein said cylinder portion is continuous about a 360 degree circumference, wherein the reinforcing portion is integrally formed with the case body.

2. A motor for driving a blower fan comprising:
a cylindrical case body having a front end opening portion and a rear end opening portion;
a rear end plate fixed on the rear end opening portion of the case body, the rear end plate having a first bearing;
a front end plate fixed on the front end opening portion of the case body, the front end plate having a second bearing;
a rotary drive shaft inserted into the central portion of the case body, the rotary drive shaft whose rear end portion is rotatably supported on the rear end plate through the first bearing and whose forward middle portion is rotatably supported on the front end plate through the second bearing;
a rotor fixed on the middle portion of the rotary drive shaft;
a stator fixed on the inner circumferential surface of the case body to face to the outer circumferential surface of the rotor; and
a circumferential reinforcing element provided in the vicinity of an end portion of the stator,
wherein the circumferential reinforcing element includes a ring portion and a cylinder portion extending from an outer peripheral edge of the ring portion, and
wherein said cylinder portion is continuous about a 360 degree circumference,
wherein, before the ring portion is fixed, the outer circumferential surface of the cylinder portion has a conic surface inclined in a direction such that a diameter increases as a distance from the ring portion increases.

3. A motor for driving a blower fan comprising:
a cylindrical case body having a front end opening portion and a rear end opening portion;
a rear end plate fixed on the rear end opening portion of the case body, the rear end plate having a first bearing;
a front end plate fixed on the front end opening portion of the case body, the front end plate having a second bearing;
a rotary drive shaft inserted into the central portion of the case body, the rotary drive shaft whose rear end portion is rotatably supported on the rear end plate through the first bearing and whose forward middle portion is rotatably supported on the front end plate through the second bearing;
a rotor fixed on the middle portion of the rotary drive shaft;
a stator fixed on the inner circumferential surface of the case body to face to the outer circumferential surface of the rotor; and
a reinforcing portion provided in the vicinity of an end portion of the stator,
wherein the reinforcing portion includes a ring portion and a cylinder portion extending from an outer peripheral edge of the ring portion, and wherein the reinforcing portion is integrally formed with the case body.

4. A motor for driving a blower fan comprising:
a cylindrical case body having a front end opening portion and a rear end opening portion;

a rear end plate fixed on the rear end opening portion of the case body, the rear end plate having a first bearing;

a front end plate fixed on the front end opening portion of the case body, the front end plate having a second bearing;

a rotary drive shaft inserted into the central portion of the case body, the rotary drive shaft whose rear end portion is rotatably supported on the rear end plate through the first bearing and whose forward middle portion is rotatably supported on the front end plate through the second bearing;

a rotor fixed on the middle portion of the rotary drive shaft;

a stator fixed on the inner circumferential surface of the case body to face to the outer circumferential surface of the rotor; and a reinforcing portion provided in the vicinity of an end portion of the stator, wherein the reinforcing portion includes a ring portion and a cylinder portion extending from an outer peripheral edge of the ring portion, and wherein, before the ring portion is fixed, the outer circumferential surface of the cylinder portion has a conic surface inclined in a direction such that a diameter increases as a distance from the ring portion increases.

* * * * *